United States Patent
Agiwal et al.

(10) Patent No.: US 12,520,276 B2
(45) Date of Patent: Jan. 6, 2026

(54) METHOD AND APPARATUS FOR TRANSMITTING AND RECEIVING PAGING IN A WIRELESS COMMUNICATION SYSTEM

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 377 days.

(21) Appl. No.: 18/041,922

(22) PCT Filed: Sep. 14, 2021

(86) PCT No.: PCT/KR2021/012523
§ 371 (c)(1),
(2) Date: Feb. 16, 2023

(87) PCT Pub. No.: WO2022/060059
PCT Pub. Date: Mar. 24, 2022

(65) Prior Publication Data
US 2024/0031985 A1 Jan. 25, 2024

(30) Foreign Application Priority Data
Sep. 15, 2020 (KR) .................. 10-2020-0118198

(51) Int. Cl.
*H04W 68/02* (2009.01)
*H04W 72/232* (2023.01)

(52) U.S. Cl.
CPC ......... *H04W 68/02* (2013.01); *H04W 72/232* (2023.01)

(58) Field of Classification Search
None
See application file for complete search history.

(56) References Cited

U.S. PATENT DOCUMENTS 10,231,208 B2    3/2019  Agiwal et al.
12,273,888 B2 *  4/2025  Lee ................. H04L 5/0051
(Continued)

FOREIGN PATENT DOCUMENTS

| WO | 2019/099661 A1 | 5/2019 |
| WO | 2019/214708 A1 | 11/2019 |
| WO | 2020/144036 A1 | 7/2020 |

OTHER PUBLICATIONS

International Search Report dated Dec. 15, 2021 in connection with International Patent Application No. PCT/KR2021/012523, 3 pages.
(Continued)

*Primary Examiner* — Clemence S Han

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method performed by a terminal in a wireless communication system is provided. The method comprises identifying a first value of a time offset between a physical downlink control channel (PDCCH) slot and a physical downlink shared channel (PDSCH) slot; receiving, from a base station, downlink control information (DCI) on a PDCCH associated with a paging, the DCI indicating a second value of the time offset larger than the first value; and receiving, from the base station, a paging message on a PDSCH based on the second value.

12 Claims, 14 Drawing Sheets

(56) References Cited

U.S. PATENT DOCUMENTS

| | | | |
|---|---|---|---|
| 2019/0261310 A1 | 8/2019 | Martin et al. | |
| 2020/0169955 A1 | 5/2020 | Chang et al. | |
| 2020/0229098 A1* | 7/2020 | Cheng | H04W 52/0248 |
| 2020/0296697 A1* | 9/2020 | Hwang | H04W 72/23 |
| 2020/0351926 A1* | 11/2020 | Bagheri | H04W 72/23 |
| 2021/0092760 A1* | 3/2021 | Nam | H04W 72/23 |
| 2022/0022137 A1* | 1/2022 | Xue | H04L 5/0091 |
| 2022/0158716 A1* | 5/2022 | Tie | H04B 7/0857 |
| 2022/0217579 A1* | 7/2022 | Seo | H04W 72/0446 |
| 2022/0312440 A1* | 9/2022 | Bagheri | H04W 72/044 |
| 2022/0338119 A1* | 10/2022 | Seo | H04W 72/044 |
| 2023/0079204 A1* | 3/2023 | Nader | H04W 68/02 |
| | | | 455/458 |
| 2023/0097949 A1* | 3/2023 | He | H04W 52/0235 |
| | | | 370/318 |
| 2023/0209464 A1* | 6/2023 | Tsai | H04W 52/0216 |
| | | | 370/311 |
| 2025/0126604 A1* | 4/2025 | Xu | H04W 72/23 |

OTHER PUBLICATIONS

Written Opinion of the International Searching Authority dated Dec. 15, 2021 in connection with International Patent Application No. PCT/KR2021/012523, 5 pages.

\* cited by examiner

METHOD AND APPARATUS FOR TRANSMITTING AND RECEIVING PAGING IN A WIRELESS COMMUNICATION SYSTEM

CROSS-REFERENCE TO RELATED APPLICATIONS

This application is a 371 of International Application No. PCT/KR2021/012523 filed on Sep. 14, 2021, which claims priority to Korean Patent Application No. 10-2020-0118198 filed on Sep. 15, 2020, the disclosures of which are herein incorporated by reference in their entirety.

BACKGROUND

1. Field

The disclosure relates to a wireless communication system. Specifically, the disclosure relates to an apparatus, a method and a system for transmitting and receiving paging and secure transmission and reception of physical downlink common control channel in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 5G or Next Generation Radio Access Network (NG-RAN) based on NR consists of NG-RAN nodes where NG-RAN node is a gNB, providing NR user plane and control plane protocol terminations toward s the UE. The gNBs are also connected by means of the NG interfaces to the 5GC, more specifically to the AMF (Access and Mobility Management Function) by means of the NG-C interface and to the UPF (User Plane Function) by means of the NG-U interface. In the $5^{th}$ generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state UE wakeups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. UE can monitor any PO in paging DRX cycle and monitors at least one PO in SI modification period. In the RRC idle/inactive mode UE monitors PO in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

For paging reception, UE has to receive and buffer PDSCH while the UE is processing PDCCH addressed to P-RNTI. This leads to unnecessary power consumption when PDSCH for paging message is scheduled in a slot different than the slot in which PDCCH is received, or when PDCCH addressed to P-RNTI does not schedule paging message.

SUMMARY

In one embodiment of the present disclosure, a method performed by a terminal in a wireless communication system is provided. The method comprises identifying a first value of a time offset between a physical downlink control channel (PDCCH) slot and a physical downlink shared channel (PDSCH) slot; receiving, from a base station, downlink control information (DCI) on a PDCCH associated with a paging, the DCI indicating a second value of the time offset larger than the first value; and receiving, from the base station, a paging message on a PDSCH based on the second value.

In one embodiment of the present disclosure, a method performed by a base station in a wireless communication system is provided. The method comprises identifying a first value of a time offset between a physical downlink control channel (PDCCH) slot and a physical downlink shared channel (PDSCH) slot; transmitting, to a terminal, downlink control information (DCI) on a PDCCH associated with a paging, the DCI indicating a second value of the time offset larger than the first value; and transmitting, to the terminal, a paging message on a PDSCH according to the second value.

In one embodiment of the present disclosure, a terminal in a wireless communication system is provided. The terminal comprises a transceiver and a controller. The controller is configured to identify a first value of a time offset between a physical downlink control channel (PDCCH) slot and a physical downlink shared channel (PDSCH) slot, receive, from abase station via the transceiver, downlink control information (DCI) on a PDCCH associated with a paging, the DCI indicating a second value of the time offset larger than the first value, and receive, from the base station via the transceiver, a paging message on a PDSCH based on the second value.

In one embodiment of the present disclosure, a base station in a wireless communication system is provided. The base station comprises a transceiver and a controller. The controller is configured to identify a first value of a time offset between a physical downlink control channel (PDCCH) slot and a physical downlink shared channel (PDSCH) slot, transmit, to a terminal via the transceiver, downlink control information (DCI) on a PDCCH associated with a paging, the DCI indicating a second value of the time offset larger than the first value and, transmit, to the terminal via the transceiver, a paging message on a PDSCH according to the second value.

According to an embodiment of the present disclosure, power consumption of UE receiving a paging message may be reduced.

DETAILED DESCRIPTION

Figure 1:
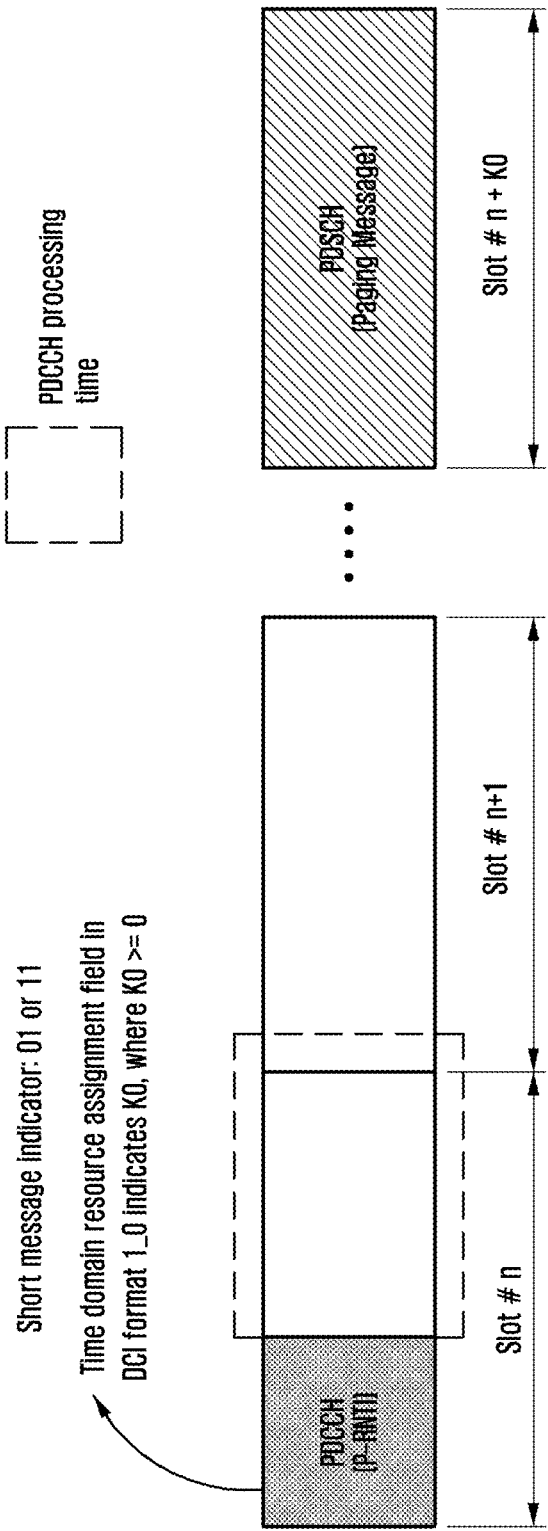
FIG. 1 illustrates an example illustration of paging message reception.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), nodeB (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of datarate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by gNB for each configured BWP wherein each search configuration is uniquely identified by an identifier. Identifier of search space configuration to be used for specific purpose such as paging reception, system information (SI) reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies Equation 1 below:

$$(y*(\text{number of slots in a radio frame})+x-\text{Monitoring-offset-PDCCH-slot}) \bmod (\text{Monitoring-periodicity-PDCCH-slot})=0. \quad [\text{Equation 1}]$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by gNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. the UE does not have to monitor PDCCH on the entire DL frequency of the serving cell. In RRC connected state, UE is configured with one or more DL and UL BWPs, for each configured Serving Cell (i.e. primary cell (PCell) or secondary cell (SCell)). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of system information blocks (SIBs) where:

the MIB is always transmitted on the BCH with a periodicity of 80 ms and repetitions made within 80 ms and the MIB includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting gNB to broadcast one or more SI message(s).

SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID.

UE acquires SIB 1 from the camped or serving cell.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific DRX may be configured by upper layers. The UE monitors short Messages transmitted with paging-RNTI (P-RNTI) over DCI; monitors a Paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

In the RRC_CONNECTED, network may initiate suspension of the RRC connection by sending RRC Release with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

The 5G or Next Generation Radio Access Network (NG-RAN) based on NR consists of NG-RAN nodes where NG-RAN node is a gNB, providing NR user plane and control plane protocol terminations toward s the UE. The gNBs are also connected by means of the NG interfaces to the 5GC, more specifically to the AMF (Access and Mobility Management Function) by means of the NG-C interface and to the UPF (User Plane Function) by means of the NG-U interface. In the $5^{th}$ generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state UE wakeups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. UE can monitor any PO in paging DRX cycle and monitors at least one PO in SI modification period. In the RRC idle/inactive mode UE monitors PO in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

The PF for a UE is the radio frame with system frame number 'SFN' which satisfies the equation (SFN+ PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE may use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)$th PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from gNB. The parameter firstPDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with cyclic redundancy check (CRC) scrambled by P-RNTI:

Short Messages Indicator—2 bits according to Table 1.

Short Messages—8 bits according to Table 2. If only the scheduling information for Paging is carried, this bit field is reserved.

Frequency domain resource assignment $-\lceil\log_2(N_{RB}^{DL,BWP}(N_{RB}^{DL,BWP}+1)/2)\rceil$ bits. If only the short message is carried, this bit field is reserved.

$N_{RB}^{DL,BWP}$ is the size of CORESET 0

Time domain resource assignment—4 bits as defined in Subclause 5.1.2.1 of TS38.214. If only the short message is carried, this bit field is reserved.

VRB-to-PRB mapping—1 bit according to Table 7.3.1.1.2-33. If only the short message is carried, this bit field is reserved.

Modulation and coding scheme—5 bits as defined in Subclause 5.1.3 of TS38.214, using Table 5.1.3.1-1. If only the short message is carried, this bit field is reserved.

TB scaling—2 bits as defined in Subclause 5.1.3.2 of TS38.214. If only the short message is carried, this bit field is reserved.

Reserved bits—6 bits

TABLE 1

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

Figure 2:
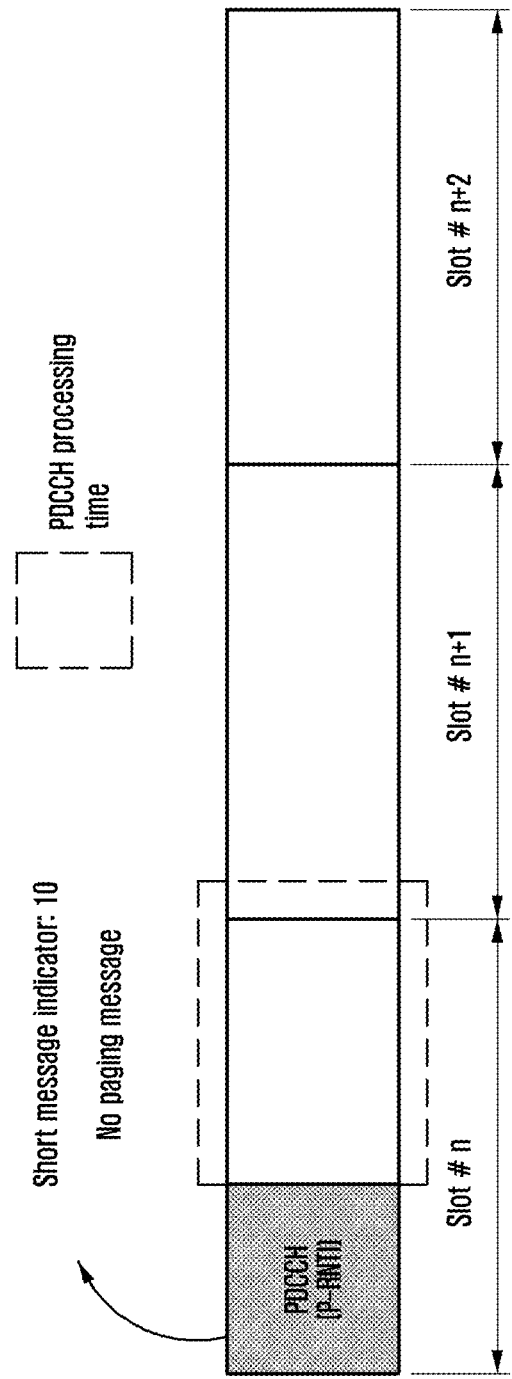
FIG. 2 illustrates another example illustration of paging message reception.
Figure 3:
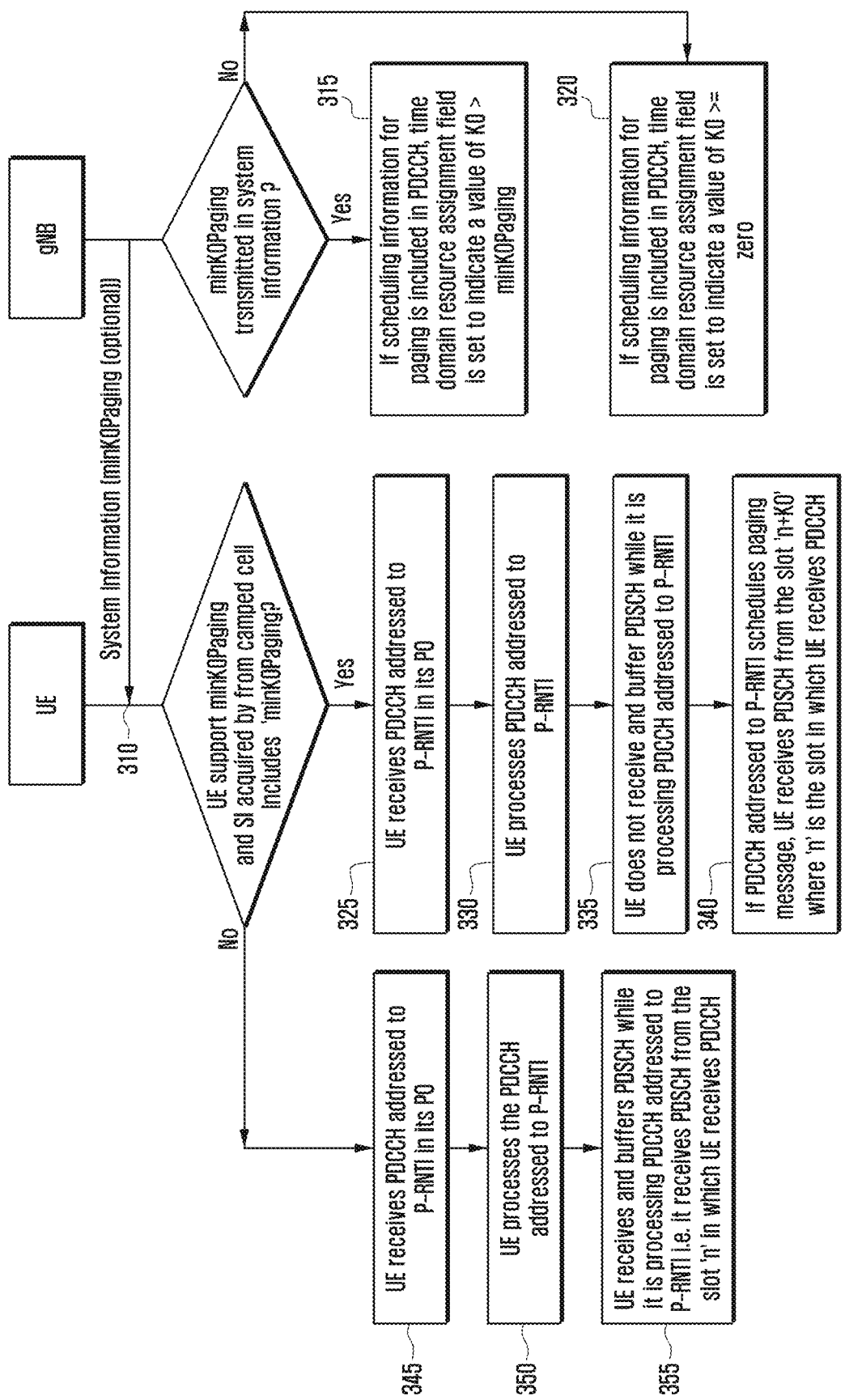
FIG. 3 illustrates a method for transmission and reception of paging using a minimum value of K0 of the present disclosure.

Issue:

For paging reception, UE has to receive and buffer PDSCH while the UE is processing PDCCH addressed to P-RNTI. This leads to unnecessary power consumption in the following cases:
  Case 1: PDSCH for paging message is scheduled in a slot different than the slot in which PDCCH addressed to P-RNTI is received
  Case 2: PDCCH addressed to P-RNTI does not schedule paging message
  So to reduce UE's power consumption, enhancement is needed to receive paging.
Method 1: Cross Slot Scheduling for Paging
  FIG. 1 is an example illustration of paging message reception. PDCCH addressed to P-RNTI is transmitted in slot 'n'. Short message indicator field (2 bits) in DCI is set to '01' or '11' which indicates that DCI includes the scheduling information for paging message. '01' indicates that scheduling information for paging message is included in DCI and short message is not included. '11' indicates that scheduling information for paging message is included in DCI and short message is also included in DCI. A list of K0 is signaled in system information, where K0>=0. Time domain resource assignment field in DCI of PDCCH addressed to P-RNTI indicates the index of a row in that list. The PDSCH including the paging message is scheduled in slot 'n+K0', where K0 is the value at $i^{th}$ row in list of K0 signalled in system information and i is indicated by Time domain resource assignment field in DCI of PDCCH addressed to P-RNTI. UE can know the value of K0 after the UE has received and decoded PDCCH addressed to P-RNTI and processed the field s of DCI. The PDSCH caring paging message can be scheduled in same slot as the PDCCH. So UE has to receive and buffer PDSCH while the UE is processing PDCCH. This reception and buffering of PDSCH is waste if DCI of PDCCH addressed to P-RNTI indicates paging message scheduled in a slot different from the slot in which PDCCH addressed to P-RNTI is received.
  FIG. 2 is another example illustration of paging message reception. PDCCH addressed to P-RNTI is transmitted in slot n. Short message indicator field (2 bits) in DCI is set to '10' which indicates that DCI includes short message and DCI does not include the scheduling information for paging message. UE can know whether paging message is scheduled or not, after the UE has received and decoded PDCCH addressed to P-RNTI and processed the fields of DCI. So UE has to receive and buffer PDSCH while the UE is processing PDCCH. This reception and buffering of PDSCH is waste if DCI of PDCCH addressed to P-RNTI indicates paging message is not scheduled.
    Method 1-1: In one method for transmission and reception of paging of the proposed invention to minimize UE's power consumption operation is as follows. FIG. 3 is an example illustration of Method 1-1.

In step 310, gNB broadcasts (or transmits) a new parameter i.e. minimum value of K0 (minK0Paging) in SIB (e.g. SIB1 or SIB 2). Inclusion of this parameter in SIB is optional. In an embodiment, minK0Paging can be included in RRCRelease message wherein the RRCRelease message includes suspend configuration and UE transitions to RRC_INACTIVE state upon receiving the RRCRelease message. In another embodiment, minK0Paging can be included in RRCReconfiguration message.
gNB schedules Paging message such that the slot in which paging message is transmitted is apart from PDCCH slot at least by minK0Paging.
  If the gNB has signaled the minK0Paging,
    in step 315, if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than (or greater than equal to) minK0Paging. Time domain resource assignment field in DCI of PDCCH addressed to P-RNTI indicates the index of a row in the list of K0s signalled in system information. The index corresponds to row which includes value of K0 greater than (or greater than equal to) minK0Paging.
  If the gNB has not signaled the minK0Paging,
    in step 320, if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than equal to zero. Time domain resource assignment field in DCI of PDCCH addressed to P-RNTI indicates the index of a row in the list of K0s signalled in system information.
If UE supports minK0Paging and SI acquired by UE from camped cell includes parameter minK0Paging or minK0Paging is received in RRCRelease message or in RRCReconfiguration message",
  in step 325, UE receives PDCCH addressed to P-RNTI in its PO,
  in step 330, UE processes the PDCCH addressed to P-RNTI,
  in step 335, UE does not receive and buffer PDSCH while the UE is processing PDCCH addressed to P-RNTI,
  in step 340, if PDCCH addressed to P-RNTI schedules paging message, UE may receive PDSCH from the slot 'n+K0', where 'n' is the slot in which UE receives PDCCH addressed to P-RNTI.
Else,
  UE follows legacy operation i.e. UE may receive and buffer PDSCH while the UE is processing PDCCH addressed to P-RNTI i.e. starting from slot 'n', where 'n' is the slot in which UE receives PDCCH addressed to P-RNTI. For example, in step 345, UE receives PDCCH addressed to P-RNTI in its PO. In step 350, UE processes the PDCCH addressed to P-RNTI. In step 355, UE receives and buffers PDSCH while the UE is processing PDCCH addressed to P-RNTI.
  The buffered information is discarded if upon processing the received PDCCH UE determines that paging message is not scheduled or is scheduled at 'n+K0' where K0 is greater than PDCCH processing time.

In an embodiment, if UE receives minK0Paging in RRCRelease message as well as in system information, UE applies minK0Paging received in RRCRelease in the above operation. In an embodiment, if UE receives minK0Paging in RRCRelease message as well as in system information, UE applies minK0Paging received in RRCRelease in the above operation if the UE is in RRC_INACTIVE.

In an embodiment, if UE receives minK0Paging in RRCRelease message as well as in system information, UE applies minimum of (minK0Paging received in RRCRelease, minK0Paging in system information) in the above operation. In an embodiment, if UE receives minK0Paging in RRCRelease message as well as in system information, UE applies minimum of (minK0Paging received in RRCRelease, minK0Paging in system information) in the above operation if the UE is in RRC_INACTIVE.

In an embodiment, if UE receives minK0Paging in RRCRelease message as well as in system information, UE applies maximum of (minK0Paging received in RRCRelease, minK0Paging in system information) in the above operation. In an embodiment, if UE receives minK0Paging in RRCRelease message as well as in system information, UE applies maximum of (minK0Paging received in RRCRelease, minK0Paging in system information) in the above operation if the UE is in RRC_INACTIVE.

In an embodiment, if UE receives minK0Paging in RRCRelease message as well as in system information, UE applies minK0Paging in RRCRelease in RRC_INACTIVE and UE applies minK0Paging in system information in RRC_IDLE. If minK0Paging is not received in RRCRelease message, UE applies minK0Paging received in system information in RRC_INACTIVE as well.

Table 3 below is an example including minK0Paging in paging configuration broadcasted in SIB1.

In an embodiment, minK0Paging, can also be applied for receiving PDSCH of which PDCCH is addressed to by P-RNTI, system information-RNTI (SI-RNTI) but not by RA-RNTI, message B-RNTI (MsgB-RNTI), temporary cell-RNTI (TC-RNTI). PDSCH scheduled by PDCCH addressed to S-RNTI includes SI message. PDSCH scheduled by PDCCH addressed to P-RNTI includes paging message.

In an embodiment, minK0Paging, can also be applied for receiving PDSCH of which PDCCH is addressed to by P-RNTI, SI-RNTI, TC-RNTI but not by RA-RNTI, MsgB-RNTI. PDSCH scheduled by PDCCH addressed to S-RNTI includes SI message. PDSCH scheduled by PDCCH addressed to P-RNTI includes paging message.

In an embodiment, minK0Paging, can also be applied for receiving PDSCH of which PDCCH is addressed to by P-RNTI, SI-RNTI, TC-RNTI, RA-RNTI, MsgB-RNTI. PDSCH scheduled by PDCCH addressed to S-RNTI includes SI message. PDSCH scheduled by PDCCH addressed to P-RNTI includes paging message.

Figure 4:
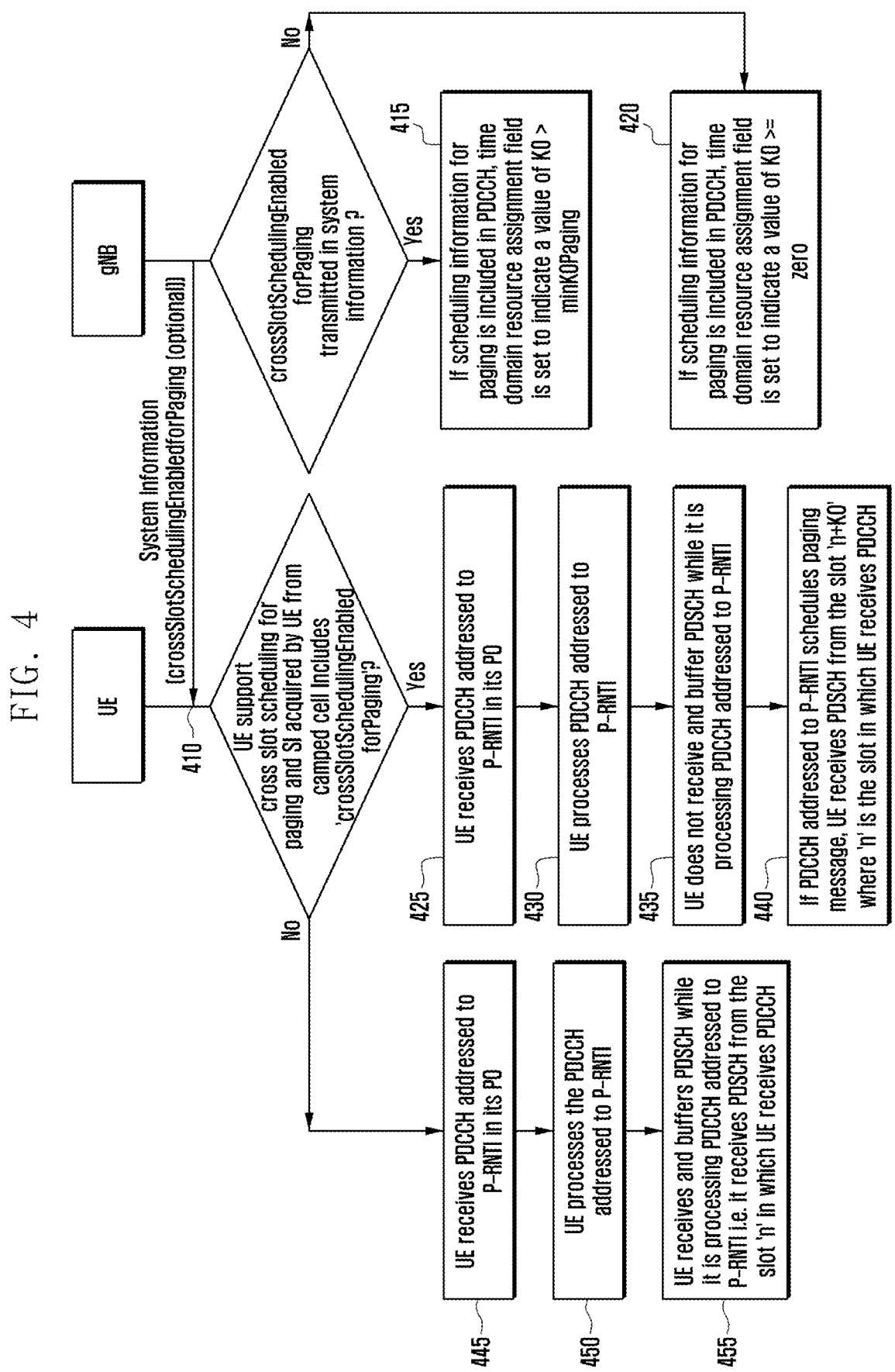
FIG. 4 illustrates a method for transmission and reception of paging using an indicator for cross slot scheduling enabled for paging of the present disclosure.

Method 1-2: In one method for transmission and reception of paging of the proposed invention to minimize UE's power consumption operation is as follows. FIG. 4 is an example illustration of Method 1-2.

In step 410, gNB broadcasts (or transmits) a new parameter i.e. crossSlotSchedulingEnabledforPaging in SIB (e.g. SIB1 or SIB 2). Inclusion of this parameter in SIB is optional. In an embodiment, crossSlotSchedulingEnabledforPaging can be included in RRCRelease message wherein the RRCRelease message includes suspend configuration and UE transitions to RRC_INACTIVE state upon receiving the RRCRelease message. In another embodiment, crossSlotSchedulingEnabledforPaging can be included in RRCReconfiguration message.

minK0Paging is pre-defined (or pre-configured or pre-determined).

TABLE 3

```
DownlinkConfigCommonSIB ::=                    SEQUENCE {
>frequencyInfoDL                                FrequencyInfoDL-SIB,
>initialDownlinkBWP                             BWP-DownlinkCommon,
>bcch-Config                                        BCCH-Config,
>pcch-Config                                        PCCH-Config,
...
}
BCCH-Config:: =                                 SEQUENCE {
>modificationPeriodCoeff                        ENUMERATED {n2, n4, n8, n16},
...
}
PCCH-Config ::=                                 SEQUENCE {
>defaultPagingCycle                                 PagingCycle,
>nAndPagingFrameOffset                              CHOICE {
>>oneT                                                  NULL,
>>halfT                                                 INTEGER (0..1),
>>quarterT                                              INTEGER (0..3),
>>oneEighthT                                            INTEGER (0..7),
>>oneSixteenthT                                         INTEGER (0..15)
},
>ns                                             ENUMERATED {four, two, one},
>firstPDCCH-MonitoringOccasionOfPO   CHOICE {
                                                }   OPTIONAL,       --
Need R
...,
[[
>nrofPDCCH-MonitoringOccasionPerSSB-InPO-r16    INTEGER (2..4)    OPTIONAL
-- Cond SharedSpectrum2
]]
[[
>minK0Paging   INTEGER (1..X)    OPTIONAL
]]
}
``` gNB schedules paging message such that the slot in which paging message is transmitted is apart from PDCCH slot at least by minK0Paging.
- If the gNB has signaled the crossSlotSchedulingEnabledforPaging,
  - in step 415, if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than (or greater than equal to) minK0Paging. Time domain resource assignment field in DCI of PDCCH addressed to P-RNTI indicates the index of a row in the list of K0s signalled in system information. The index corresponds to row which includes value of K0 greater than (or greater than equal to) minK0Paging.
- If the gNB has not signaled the crossSlotSchedulingEnabledforPaging,
  - in step 420, if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than equal to zero. Time domain resource assignment field in DCI of PDCCH addressed to P-RNTI indicates the index of a row in the list of K0s signalled in system information.

If UE supports cross slot scheduling for paging and SI acquired by UE from camped cell includes parameter crossSlotSchedulingEnabledforPaging or crossSlotSchedulingEnabledforPaging is received in RRCRelease message or in RRCReconfiguration message,
- in step 425, UE receives PDCCH addressed to P-RNTI in its PO,
- in step 430, UE processes the PDCCH addressed to P-RNTI,
- in step 435, UE does not receive and buffer PDSCH while the UE is processing PDCCH addressed to P-RNTI,
- in step 440, If PDCCH addressed to P-RNTI schedules paging message, UE may receive PDSCH from the slot 'n+K0', where 'n' is the slot in which UE receives PDCCH addressed to P-RNTI.

Else,
- UE follows legacy operation i.e. UE may receive and buffer PDSCH while the UE is processing PDCCH addressed to P-RNTI i.e. starting from slot 'n', where 'n' is the slot in which UE receives PDCCH addressed to P-RNTI. For example, in step 445, UE receives PDCCH addressed to P-RNTI in its PO. In step 450, UE processes the PDCCH addressed to P-RNTI. In step 455, UE receives and buffers PDSCH while the UE is processing PDCCH addressed to P-RNTI.
- The buffered information is discarded if upon processing the received PDCCH UE determines that paging message is not scheduled or is scheduled at 'n+K0' where K0 is greater than PDCCH processing time.

Table 4 below is an example including crossSlotSchedulingEnabledforPaging in paging configuration broadcasted in SIB1.

TABLE 4

```
DownlinkConfigCommonSIB ::=        SEQUENCE {
>frequencyInfoDL                   FrequencyInfoDL-SIB,
>initialDownlinkBWP                BWP-DownlinkCommon,
>bcch-Config                       BCCH-Config,
>pcch-Config                       PCCH-Config,
...
}
BCCH-Config:: =                    SEQUENCE {
>modificationPeriodCoeff           ENUMERATED {n2, n4, n8, n16},
...
}
PCCH-Config ::=                    SEQUENCE {
>defaultPagingCycle                PagingCycle,
>nAndPagingFrameOffset             CHOICE {
>>oneT                                 NULL,
>>halfT                                INTEGER (0..1),
>>quarterT                             INTEGER (0..3),
>>oneEighthT                           INTEGER (0..7),
>>oneSixteenthT                        INTEGER (0..15)
},
>ns                                ENUMERATED {four, two, one},
>firstPDCCH-MonitoringOccasionOfPO  CHOICE {
                                       } OPTIONAL,    --
Need R
...,
[[
>nrofPDCCH-MonitoringOccasionPerSSB-InPO-r16    INTEGER (2..4)    OPTIONAL
-- Cond SharedSpectrum2
]]
[[
>crossSlotSchedulingEnabledforPaging  ENUMERATED (true)  OPTIONAL
]]   }
```

In an embodiment, minK0Paging, as explained above can also be applied for receiving PDSCH of which PDCCH is addressed toby P-RNTI, SI-RNTI but not by RA-RNTI, MsgB-RNTI, TC-RNTI. PDSCH scheduled by PDCCH addressed to S-RNTI includes SI message. PDSCH scheduled by PDCCH addressed to P-RNTI includes paging message.

In an embodiment, minK0Paging, as explained above can also be applied for receiving PDSCH of which PDCCH is addressed to by P-RNTI, SI-RNTI, TC-RNTI but not by RA-RNTI, MsgB-RNTI. PDSCH scheduled by PDCCH addressed to S-RNTI includes SI message. PDSCH scheduled by PDCCH addressed to P-RNTI includes paging message.

In an embodiment, minK0Paging, as explained above can also be applied for receiving PDSCH of which PDCCH is addressed to by P-RNTI, SI-RNTI, TC-RNTI, RA-RNTI, MsgB-RNTI. PDSCH scheduled by PDCCH addressed to S-RNTI includes SI message. PDSCH scheduled by PDCCH addressed to P-RNTI includes paging message.

Figure 5:
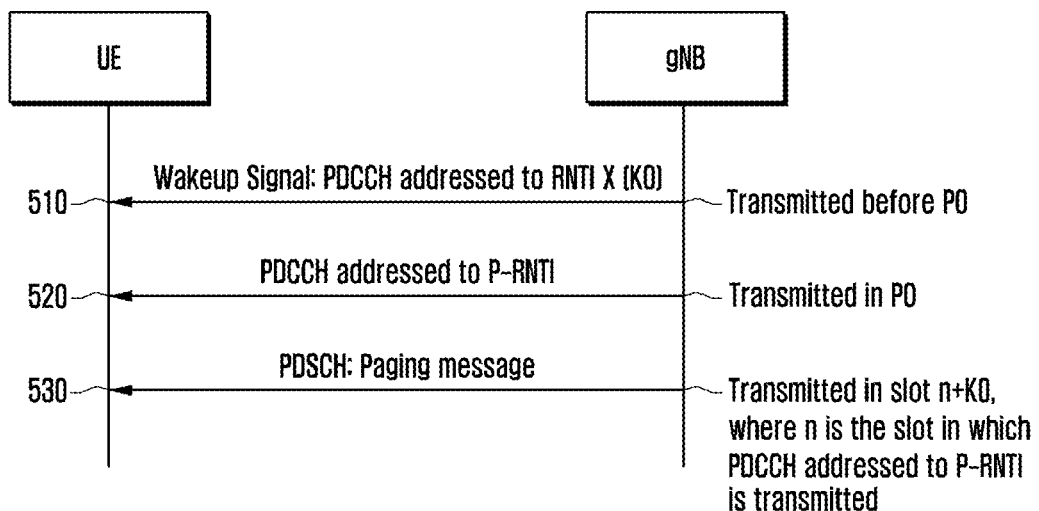
FIG. 5 illustrates a method for transmission and reception of paging using a wakeup signal before PO of the present disclosure.

Method 1-3: In one method for transmission and reception of paging of the proposed invention to minimize UE's power consumption operation is as follows. FIG. 5 is an example illustration of Method 1-3.

UE monitors wakeup signal before its PO. For wakeup signal UE monitors and receives a first PDCCH addressed to a pre-defined RNTI (e.g. RNTI X or P-RNTI) before the PO in step 510. DCI of this first PDCCH addressed to pre-defined RNTI, indicates whether a second PDCCH addressed to P-RNTI is transmitted in the PO or not. In step 520, UE receives the second PDCCH addressed to P-RNTI in the PO. If the second PDCCH addressed to P-RNTI schedules paging message, DCI of this first PDCCH addressed to pre-defined RNTI indicates K0 for determining the slot for PDSCH carrying paging message. The time domain resource assignment field can be included in first PDCCH addressed to pre-defined RNTI to indicate K0. Time domain resource assignment field in DCI of first PDCCH addressed to pre-defined RNTI indicates the index of a row in the list of K0s signalled in system information Since K0 is known to UE using the first PDCCH, while decoding and processing the $2^{nd}$ PDCCH, UE can determine whether to receive and buffer PDSCH or not. In step 530, UE receives PDSCH including paging message. If K0 is equal to zero or if n+K0 slot will start before completion of decoding and processing the $2^{nd}$ PDCCH, UE receives and buffers PDSCH from the start of n+K0, where n is the slot in which second PDCCH addressed to P-RNTI is received. Otherwise, there is no need to receive and buffer PDSCH while $2^{nd}$ PDCCH processing is ongoing.

Method 1-4: In one method for transmission and reception of paging of the proposed invention to minimize UE's power consumption operation is as follows:

gNB broadcasts (or transmits) configuration of wakeup signal for paging.
minK0Paging is pre-defined. Alternately, minK0Paging is signaled as in method 1-1.
gNB schedules Paging message such that the slot in which paging message is transmitted is apart from PDCCH slot at least by minK0Paging.
If the gNB has broadcasted configuration of wakeup signal for paging,
if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than (or greater than equal to) minK0Paging. Time domain resource assignment field in DCI of PDCCH addressed to P-RNTI indicates the index of a row in the list of K0s signalled in system information. The index corresponds to row which includes value of K0 greater than (or greater than equal to) minK0Paging.
If the gNB has not broadcasted configuration of wakeup signal for paging,
if PDCCH addressed to P-RNTI transmitted by gNB schedules paging message i.e. short message indicator in DCI of PDCCH addressed to P-RNTI is set to 01 or 11, time domain resource assignment field is set to indicate a value of K0 which is greater than equal to zero. Time domain resource assignment field in DCI of PDCCH addressed to P-RNTI indicates the index of a row in the list of K0s signalled in system information.
If SI acquired by UE from camped cell includes configuration of wakeup signal for paging,
UE monitors wakeup signal before its PO.
For wakeup signal UE monitors a first PDCCH addressed to a pre-defined RNTI (e.g. RNTI X) before the PO. DCI of this PDCCH addressed to pre-defined RNTI, indicates whether a second PDCCH addressed to P-RNTI is transmitted in the PO or not.
Alternately wakeup signal can be sequence based and detection of sequence in wakeup signal occasions is an indication that PDCCH addressed to P-RNTI is transmitted in PO.
UE processes the PDCCH addressed to P-RNTI if indicated by wakeup signal.
UE does not receive and buffer PDSCH while the UE is processing PDCCH addressed to P-RNTI.
If PDCCH addressed to P-RNTI schedules paging message, UE may receive PDSCH from the slot 'n+K0', where 'n' is the slot in which UE receives PDCCH addressed to P-RNTI.
Else,
UE follows legacy operation i.e. UE may receive and buffer PDSCH while the UE is processing PDCCH addressed to P-RNTI i.e. starting from slot 'n', where 'n' is the slot in which UE receives PDCCH addressed to P-RNTI.
The buffered information is discarded if upon processing the received PDCCH UE determines that paging message is not scheduled or is scheduled at 'n+K0' where K0 is greater than PDCCH processing time.

Method 2: Minimizing UE Power Consumption Due to SSB Monitoring

Figure 6:
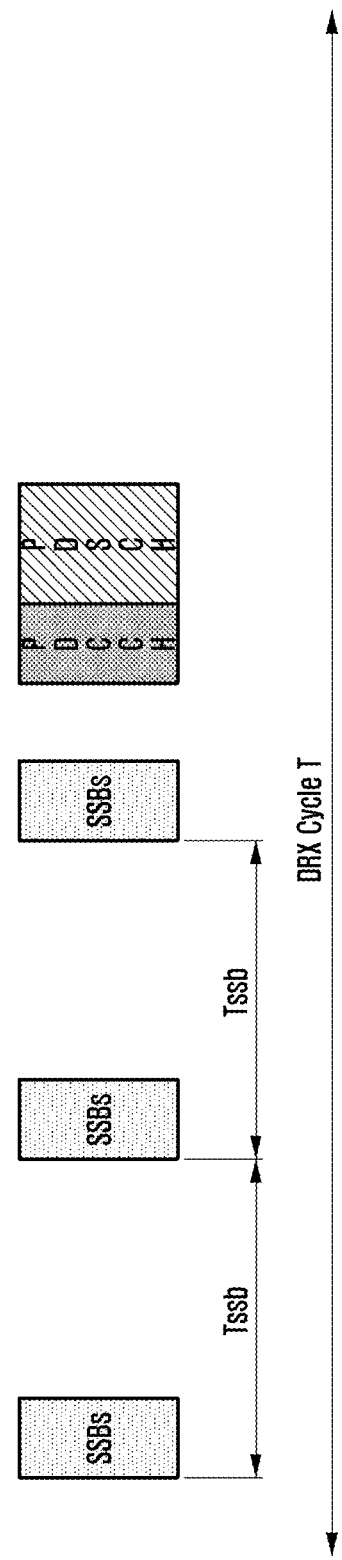
FIG. 6 illustrates an example illustration of monitoring SSBs plural times before PO.

UE needs to monitor SSBs several times for PDSCH decoding in case of low SINR. As shown in FIG. 6, UE monitors SSBs three times before the PO. Note that whether there is PDSCH including paging message or not can be known only after PDCCH decoding. So UE has to monitor SSBs multiple times before the PO. This leads to increased UE's power consumption in case paging message is not scheduled by PDCCH addressed to P-RNTI in PO or if PDCCH addressed to P-RNTI is not received in PO.

Figure 7:
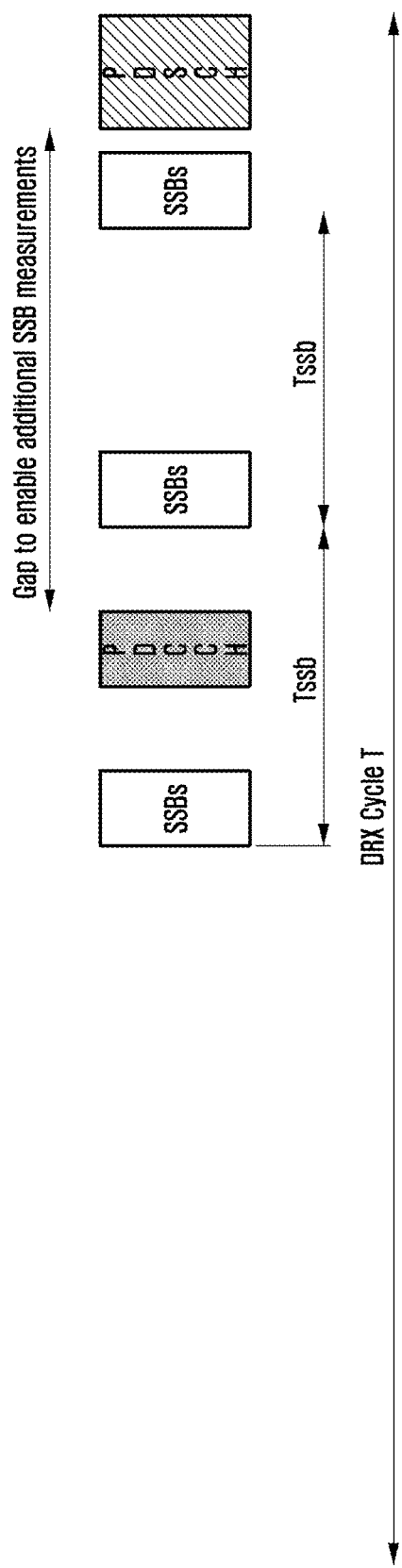
FIG. 7 illustrates a method for monitoring SSBs only once before PO of the present disclosure.

In one method of the invention it is proposed to configure a large gap between PDCCH and PDSCH. The large gap can be in multiple of SSB periodicity or periodicity of tracking reference signal (TRS). The slot(s) in which PDCCH addressed to P-RNTI is transmitted can be referred paging sub-occasion 1 or PO part 1. The slot(s) in which PDSCH scheduled by PDCCH is transmitted can be referred as paging sub-occasion 2 or PO part 2. As shown in FIG. 7, UE monitors SSBs only once before the PO or paging sub-occasion 1 or PO part 1 (i.e. before the slot in which PDCCH addressed to P-RNTI is received). UE then monitors PDCCH addressed to P-RNTI in PO or paging sub-occasion 2 or PO part 2. If PDCCH addressed to P-RNTI is received and DCI includes scheduling information for paging message, UE monitors SSBs, TRSs, or any other RSs (if needed, e.g. in case of low SINR) before the reception of PDSCH (paging sub-occasion 2 or PO part 2) and after reception of PDCCH addressed to P-RNTI (paging sub-occasion 1 or PO part 1), UE then receives and decodes PDSCH.

If PDCCH addressed to P-RNTI is transmitted in slot n, PDSCH can be transmitted in slot n+gap+K0. Gap can be signaled in paging configuration or system information. Gap can be k*RS periodicity, where 'k' is signaled in paging configuration or system information or can be pre-defined. RS periodicity can be SSB periodicity or TRS periodicity or min (SSB periodicity, TRS periodicity). CSI-RS can also be used in place of TRS.

Method 3: Securing PDCCH

In the 5G wireless communication system, RRC signaling messages and user data are secured using encryption and integrity protection. However, L 1 signaling such as downlink control information transmitted in PDCCH is not secured. Since several critical signaling and resources for user data and RRC signaling is scheduled by PDCCH it is worthwhile to secure the PDCCH.

Method 3-1:

In one method of invention, security key ($K_{PDCCHint}$ key) for integrity protection of PDCCH is derived from $K_{gNB}$. $K_{gNB}$ is established at UE and gNB at the time of connection establishment.

Figure 8:
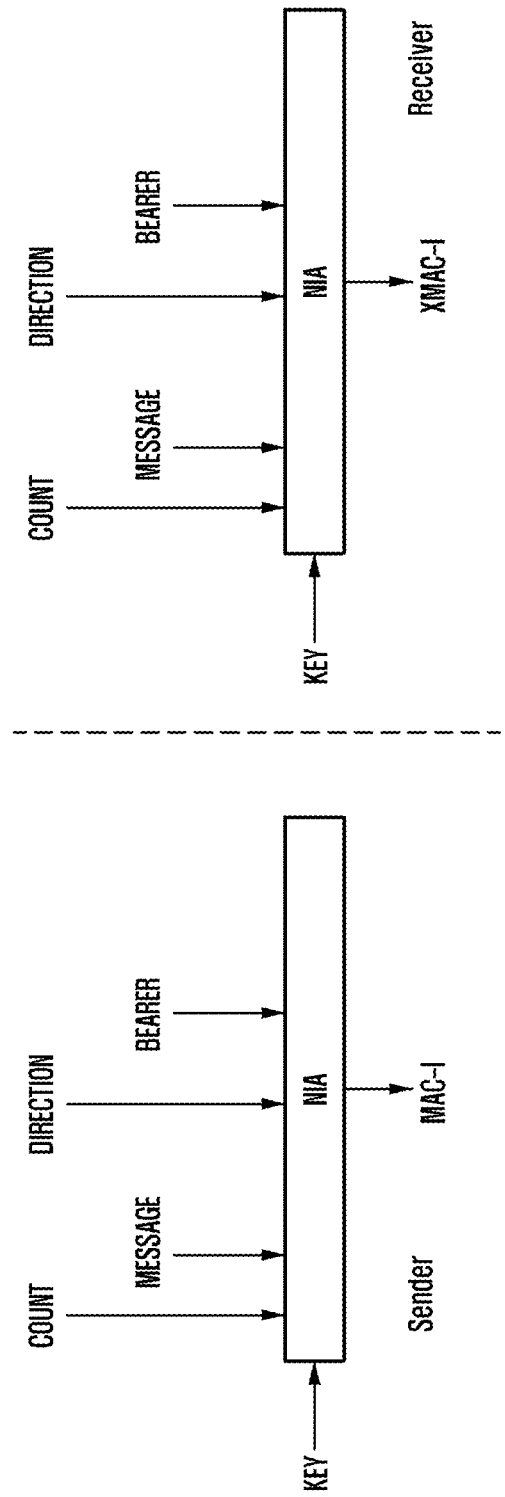
FIG. 8 illustrates examples of MAC-I and XMAC-I for securing PDCCH of the present disclosure.

For securing PDCCH, message authentication code-integrity (MAC-I)/expected message authentication code-integrity (XMAC-I) is generated as shown in FIG. 8 by the gNB/UE, where KEY: an 128-bit integrity key $K_{PDCCHint}$
MESSAGE: DCI
BEARER: a 5-bit bearer identity, set to a pre-defined value
DIRECTION: set to 1
COUNT: derived from half-frame number (HFN)/system frame number (SFN)/subframe/slot/symbol number or universal time coordinated (UTC) time HFN/SFN/subframe/slot/symbol number or UTC time corresponds to the HFN/SFN/subframe/slot/symbol in which PDCCH is transmitted/received.

Alternately, a separate counter associated with the key ($K_{PDCCHint}$) can be maintained and incremented for every MAC-I derivation for PDCCH. In this case Counter is also transmitted in DCI.

The generated MAC-I is attached at the end of DCI instead of CRC. Upon receiving PDCCH, UE generates XMAC-I and verifies if it is same as received MAC-I or not. If matches, UE processes the received DCI, otherwise not.

Asymmetric L1 security for UE specific DCI:

Instead of MAC-I, Digital Signature is applied by the gNB using private key and UE verifies with the public key. Public key (either Raw Public Key or via Certificate) and security information (cryptographic algorithm) is provided to the UE via a AS messages. Raw Public Key is provided in a protect AS signaling message and Certificate is provided in protected/unprotected AS signaling message.

Method 3-2:

In one method of invention, security key ($K_{PDCCHint}$ key) for integrity protection of PDCCH is derived from $K_{gNB}$. $K_{gNB}$ is established at UE and gNB at the time of connection establishment.

For securing PDCCH, MAC-I/XMAC-I is generated as shown in FIG. 8 by the gNB/UE, where KEY: an 128-bit integrity key $K_{PDCCHint}$
MESSAGE: DCI
BEARER: a 5-bit bearer identity, set to a pre-defined value
DIRECTION: set to 1
COUNT: derived from HFN/SFN/subframe/slot/symbol number or UTC time HFN/SFN/subframe/slot/symbol number or UTC time corresponds to the HFN/SFN/subframe/slot/symbol in which PDCCH is transmitted/received. Alternately, a separate counter associated with the key ($K_{PDCCHint}$) can be maintained and incremented for every MAC-I derivation for PDCCH. In this case the counter is also transmitted in DCI.

The generated MAC-I is attached at the end of DCI.

CRC is then generated over DCI+MAC-I and added at the end of DCI+MAC-I. CRC is then scrambled using RNTI. DCI+MAC-I+scrambled CRC is sent to UE.

Figure 9:
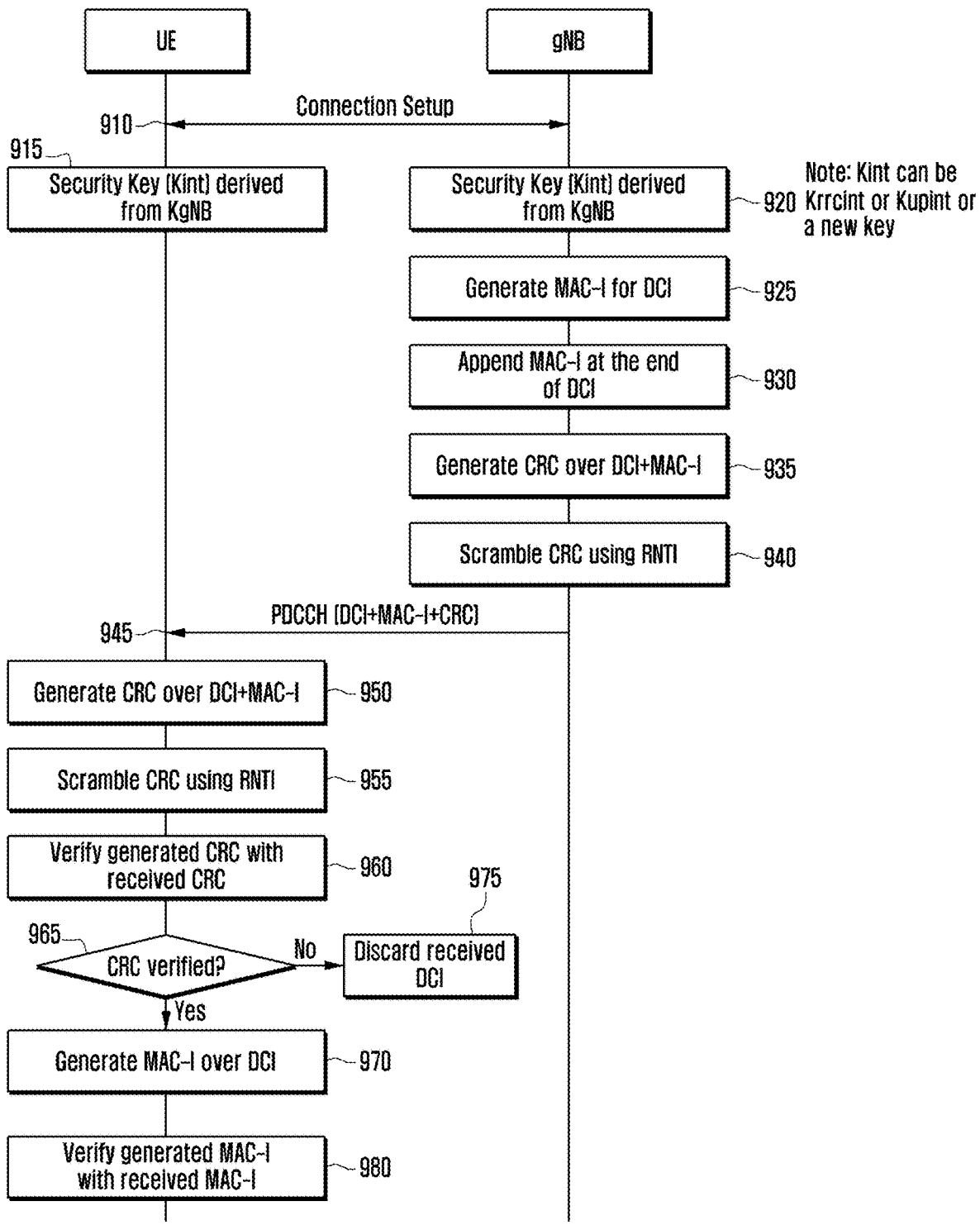
FIG. 9 illustrates an operation between UE and gNB for integrity protection of PDCCH of the present disclosure.

The detailed operation between UE and gNB is shown in FIG. 9. In step 910, UE and gNB setup a connection. In step 915, UE identifies security key $K_{int}$ derived from $K_{gNB}$. In step 920, gNB identifies security key $K_{int}$ derived from $K_{gNB}$. $K_{int}$ can be $K_{rrcint}$ or $K_{upint}$ or a new key ($K_{PDCCHint}$). In step 925, gNB generates MAC-I for DCI. In step 930, gNB appends the generated MAC-I at the end of DCI. In step 935, gNB generates CRC over DCI+MAC-I. In step 940, gNB scrambles CRC using RNTI. In step 945, gNB transmits PDCCH including DCI+MAC-I+CRC to UE. In step 950, UE generates CRC over DCI+MAC-I. In step 955, UE scrambles CRC using RNTI. In step 960, UE verifies the generated CRC with the received CRC from the gNB. In step 965, UE identifies whether the CRC is verified or not. In step 970, if the CRC is not verified, UE discards the received DCI. In step 975, if the CRC is verified, UE generates MAC-I over DCI. In step 980, UE verifies the generated MAC-I with the received MAC-I from the gNB.

Method 3-3:

In one method of invention, security key ($K_{PDCCH}$ key) for integrity protection of PDCCH is derived from $K_{gNB}$. $K_{gNB}$ is established at UE and gNB at the time of connection establishment.

UE and gNB generate a security code 'H' using security key, HFN/SFN/subframe/slot/symbol number or time counter and sharedSecretData. HFN/SFN/subframe/slot/symbol number or time counter corresponds to the HFN/SFN/subframe/slot/symbol in which PDCCH is transmitted/received by gNB/UE. H can be generated in advance and stored by UE and/or gNB. gNB can provide the shared SecretData to UE in dedicated RRC signaling. Security code could be MAC-I or could be derived using hash function.

CRC is generated over 'security code+DCI'. CRC is appended to DCI. CRC is scrambled using RNTI. gNB transmits DCI+CRC to UE.

Figure 10:
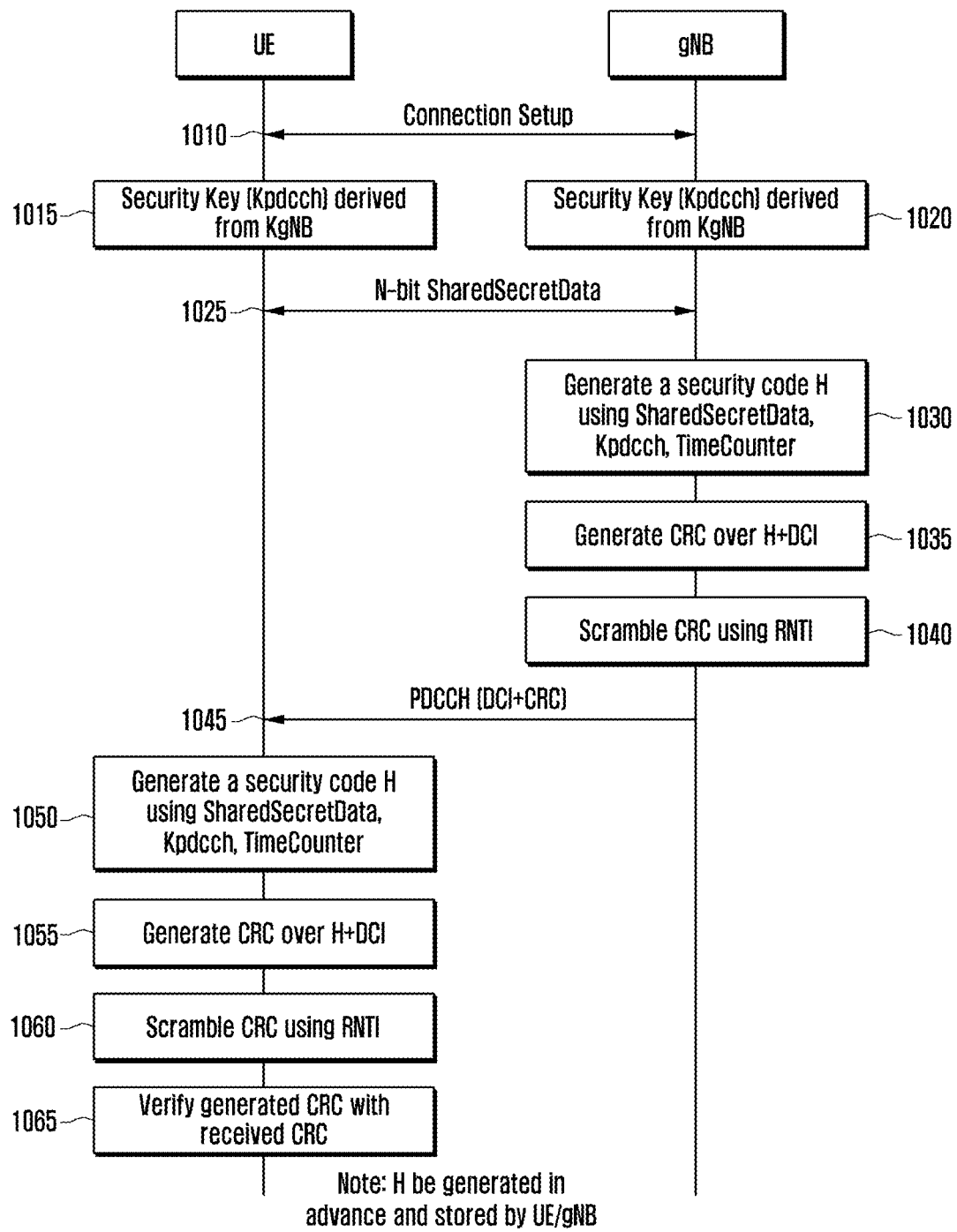
FIG. 10 illustrates an operation between UE and gNB for integrity protection of PDCCH using a security code of the present disclosure.

The detailed operation between UE and gNB is shown in FIG. 10. In step 1010, UE and gNB setup a connection. In step 1015, UE identifies security key $K_{pdcch}$ derived from $K_{gNB}$. In step 1020, gNB identifies security key $K_{pdcch}$ derived from $K_{gNB}$. In step 1025, gNB provides shared-SecretData (N-bit) to UE in dedicated RRC signaling. In step 1030, gNB generates a security code H using at least one of shared SecretData, $K_{pdcch}$, and time counter. In step 1035, gNB generates CRC over H+DCI. In step 1040, gNB scrambles CRC using RNTI. In step 1045, gNB transmits PDCCH including DCI+CRC to UE. In step 1050, UE generates a security code H using at least one of sharedSecretData, $K_{pdcch}$, and time counter. In step 1055, UE generates CRC over H+DCI. In step 1060, UE scrambles CRC using RNTI. In step 1065, UE verifies the generated CRC with the received CRC from the gNB.

Method 3-4:

In one method of invention, security key ($K_{pdcch}$ key) for integrity protection of PDCCH is derived from $K_{gNB}$. $K_{gNB}$ is established at UE and gNB at the time of connection establishment.

UE and gNB generate an index 'H' using security key, HFN/SFN/subframe/slot/symbol number or time counter and sharedSecretData. HFN/SFN/subframe/slot/symbol number or time counter corresponds to the HFN/SFN/subframe/slot/symbol in which PDCCH is transmitted/received by gNB/UE. H can be generated in advance and stored by UE and/or gNB. gNB can provide the shared SecretData to UE in dedicated RRC signaling. Security code could be MAC-I or could be derived using hash function. For MAC-I, bearer can be set to pre-defined value and direction set to 1.

CRC is generated over DCI. CRC is appended to DCI. Based on the index (i.e. H), UE and gNB determine which 16 bits out of 24-bits of CRC are scrambled using RNTI. Determined bits of CRC are scrambled using RNTI. gNB transmits DCI+scrambled CRC to UE.

Figure 11:
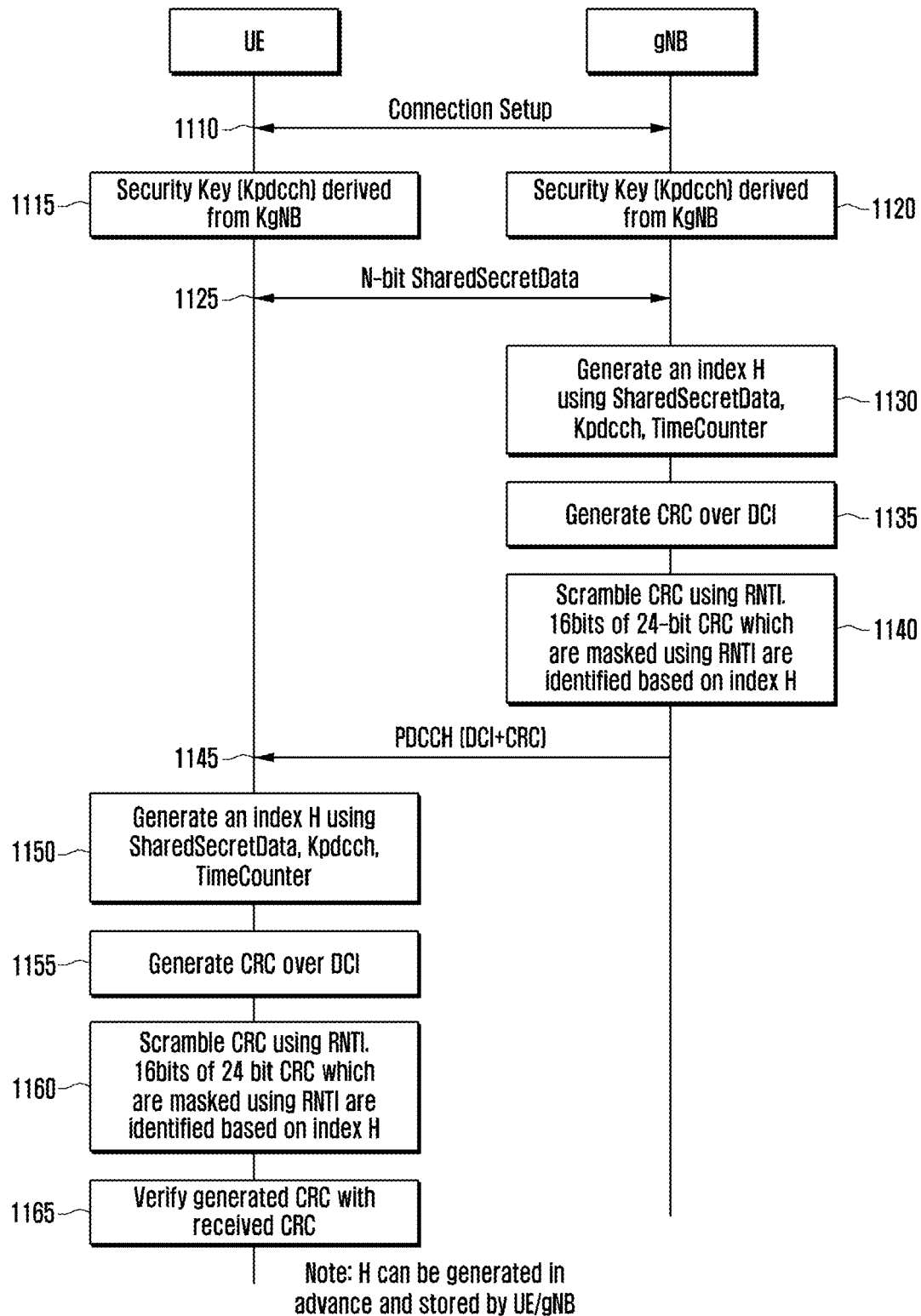
FIG. 11 illustrates an operation between UE and gNB for integrity protection of PDCCH using an index of the present disclosure.

The detailed operation between UE and gNB is shown in FIG. 11. In step 1110, UE and gNB setup a connection. In step 1115, UE identifies security key Kpdcch derived from KgNB. In step 1120, gNB identifies security key Kpdcch derived from KgNB. In step 1125, gNB provides shared SecretData (N-bit) to UE in dedicated RRC signaling. In step 1130, gNB generates an index H using at least one of sharedSecretData, Kpdcch, and time counter. In step 1135, gNB generates CRC over DCI. In step 1140, gNB scrambles CRC using RNTI. 16 bits of 24-bit CRC which are masked using RNTI are identified based on the index X. In step 1145, gNB transmits PDCCH including DCI+CRC to UE. In step 1150, UE generates an index H using at least one of sharedSecretData, Kpdcch, and time counter. In step 1155, UE generates CRC over DCI. In step 1160, UE scrambles CRC using RNTI. 16 bits of 24-bit CRC which are masked using RNTI are identified based on the index X. In step 1165, UE verifies the generated CRC with the received CRC from the gNB.

Method 3-5:

In one method of invention, security key ($K_{PDCCHint}$ key) for integrity protection of PDCCH is derived from $K_{gNB}$. $K_{gNB}$ is established at UE and gNB at the time of connection establishment.

For securing PDCCH, MAC-I/XMAC-I is generated as shown in FIG. 8 by the gNB/UE, where KEY: an 128-bit integrity key $K_{PDCCHint}$

MESSAGE: DCI

BEARER: a 5-bit bearer identity, set to a pre-defined value

DIRECTION: set to 1

COUNT: derived from HFN/SFN/subframe/slot/symbol number or UTC time. HFN/SFN/subframe/slot/symbol number or UTC time corresponds to the HFN/SFN/subframe/slot/symbol in which PDCCH is transmitted/received by gNB/UE.

Alternately, a separate counter associated with the key can be maintained and incremented for every MAC-I derivation for PDCCH. In this case the counter is also transmitted in DCI.

Figure 12:
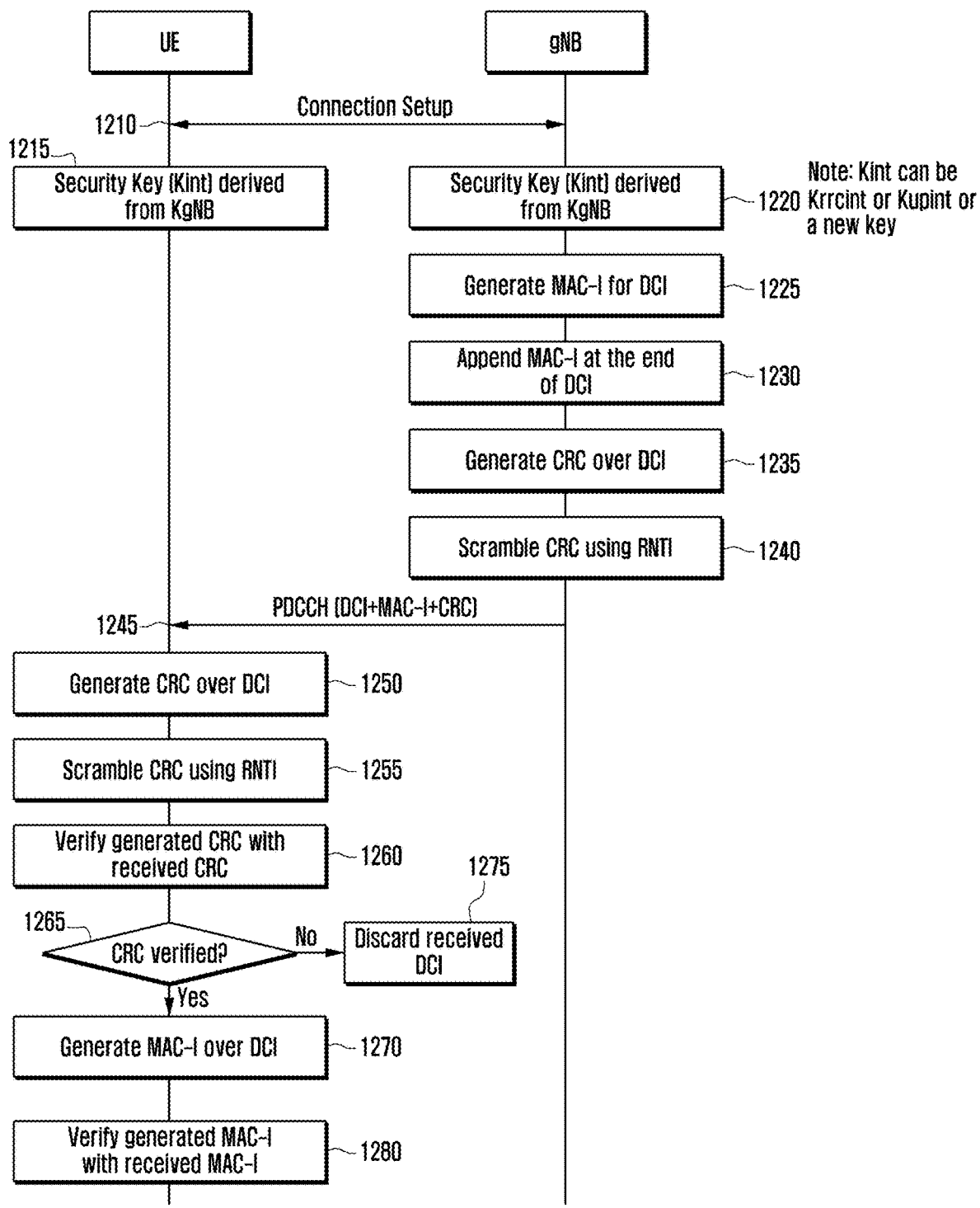
FIG. 12 illustrates an operation between UE and gNB for integrity protection of PDCCH of the present disclosure.

CRC is then generated over DCI. CRC is then scrambled using RNTI. DCI+MAC-I+scrambled CRC is sent to UE. The detailed operation between UE and gNB is shown in FIG. 12. In step 1210, UE and gNB setup a connection. In step 1215, UE identifies security key $K_{int}$ derived from $K_{gNB}$. In step 1220, gNB identifies security key $K_{int}$ derived from $K_{gNB}$. $K_{int}$ can be $K_{rrcint}$ Or $K_{upint}$ or a new key. In step 1225, gNB generates MAC-I for DCI. In step 1230, gNB appends the generated MAC-I at the end of DCI. In step 1235, gNB generates CRC over DCI. In step 1240, gNB scrambles CRC using RNTI. In step 1245, gNB transmits PDCCH including DCI+MAC-I+CRC to UE. In step 1250, UE generates CRC over DCI. In step 1255, UE scrambles CRC using RNTI. In step 1260, UE verifies the generated CRC with the received CRC from the gNB. In step 1265, UE identifies whether the CRC is verified or not. In step 1270, if the CRC is not verified, UE discards the received DCI. In step 1275, if the CRC is verified, UE generates MAC-I over DCI. In step 1280, UE verifies the generated MAC-I with the received MAC-I from the gNB.

Figure 13:
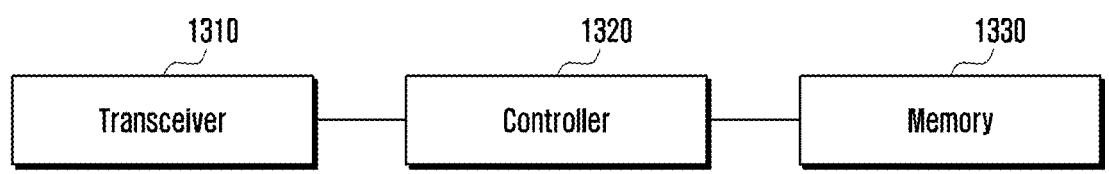
FIG. 13 illustrates a block diagram of a terminal according to an embodiment of the disclosure.

FIG. 13 illustrates a block diagram of a terminal according to an embodiment of the disclosure.

Referring to FIG. 13, a terminal includes a transceiver 1310, a controller 1320 and a memory 1330. The controller 1320 may refer to a circuitry, an application-specific integrated circuit (ASIC), or at least one processor. In an embodiment, the operations of the terminal may be implemented using the memory 1330 storing corresponding program codes. Specifically, the terminal may be equipped with the memory 1330 to store program codes implementing desired operations. To perform the desired operations, the controller 1320 may read and execute the program codes stored in the memory 1630 by using a processor or a CPU. The transceiver 1310, the controller 1320 and the memory 1330 are configured to perform the operations of the terminal illustrated in the figures, e.g. FIGS. 1 to 12, or described above. Although the transceiver 1310, the controller 1320 and the memory 1330 are shown as separate entities, they may be realized as a single entity like a single chip. Or, the transceiver 1310, the controller 1320 and the memory 1330 may be electrically connected to or coupled with each other.

The transceiver 1310 may transmit and receive signals to and from other network entities, e.g., a base station.

The controller 1320 may control the UE to perform functions according to one of the embodiments described above.

For example, the controller 1320 may identify a first value of a time offset between a physical downlink control channel (PDCCH) slot and a physical downlink shared channel (PDSCH) slot, receive, from a base station via the transceiver 1310, downlink control information (DCI) on a PDCCH associated with a paging, the DCI indicating a second value of the time offset larger than the first value, and receive, from the base station via the transceiver 1310, a paging message on a PDSCH based on the second value.

Figure 14:
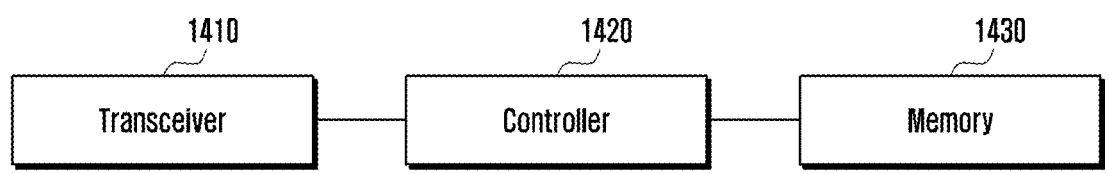
FIG. 14 illustrates a block diagram of abase station according to an embodiment of the disclosure.

FIG. 14 illustrates a block diagram of a base station according to an embodiment of the disclosure.

Referring to FIG. 14, a base station includes a transceiver 1410, a controller 1420 and a memory 1430. The controller 1420 may refer to a circuitry, an ASIC, or at least one processor. In an embodiment, the operations of the base station may be implemented using the memory 1430 storing corresponding program codes. Specifically, the base station may be equipped with the memory 1430 to store program codes implementing desired operations. To perform the desired operations, the controller 1420 may read and execute the program codes stored in the memory 1430 by using a processor or a CPU.

The transceiver 1410, the controller 1420 and the memory 1430 are configured to perform the operations of the network (e.g., gNB) illustrated in the figures, e.g. FIGS. 1 to 12, or described above. Although the transceiver 1410, the controller 1420 and the memory 1430 are shown as separate entities, they may be realized as a single entity like a single chip. The transceiver 1410, the controller 1420 and the memory 1430 may be electrically connected to or coupled with each other.

The transceiver 1410 may transmit and receive signals to and from other network entities, e.g., a terminal.

The controller 1420 may control the base station to perform functions according to one of the embodiments described above.

For example, The controller 1420 may identify a first value of a time offset between a physical downlink control channel (PDCCH) slot and a physical downlink shared channel (PDSCH) slot, transmit, to a terminal via the transceiver 1410, downlink control information (DCI) on a PDCCH associated with a paging, the DCI indicating a second value of the time offset larger than the first value and, transmit, to the terminal via the transceiver 1410, a paging message on a PDSCH according to the second value.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   receiving, from a base station, system information including an indicator associated with a cross-slot scheduling for a paging;
   determining whether the terminal supports the cross-slot scheduling for the paging;
   in case that the terminal supports the cross-slot scheduling for the paging, identifying a first value of a time offset between a physical downlink control channel (PDCCH) slot and a physical downlink shared channel (PDSCH) slot, the first value being predetermined;
   receiving, from the base station, downlink control information (DCI) on a PDCCH associated with a paging radio network temporary identifier (P-RNTI), the DCI indicating a second value of the time offset larger than the first value; and
   receiving, from the base station, a paging message on a PDSCH based on the second value.

2. The method of claim 1, wherein identifying the first value further comprises:
   receiving, from the base station, system information including the first value; and
   identifying the first value included in the received system information.

3. The method of claim 1, wherein the PDSCH including the paging message is received after the PDCCH associated with the paging is processed.

4. A method performed by a base station in a wireless communication system, the method comprising:
   identifying a first value of a time offset between a physical downlink control channel (PDCCH) slot and a physical downlink shared channel (PDSCH) slot, wherein the first value is predetermined;
   transmitting, to a terminal, system information including an indicator associated with a cross-slot scheduling for a paging;
   transmitting, to the terminal, downlink control information (DCI) on a PDCCH associated with a paging radio network temporary identifier (P-RNTI), the DCI indicating a second value of the time offset larger than the first value; and
   transmitting, to the terminal, a paging message on a PDSCH according to the second value.

5. The method of claim 4, further comprising transmitting, to the terminal, system information including the first value.

6. The method of claim 4,
   wherein the PDSCH including the paging message is transmitted after the PDCCH associated with the paging is processed in the terminal.

7. A terminal in a wireless communication system, the terminal comprising:
   a transceiver; and
   a controller configured to:
   receive, from a base station, system information including an indicator enabling a cross-slot scheduling for a paging,
   determine whether the terminal supports the cross-slot scheduling for the paging,
   identify a first value of a time offset between a physical downlink control channel (PDCCH) slot and a physical downlink shared channel (PDSCH) slot, the first value being predetermined,
   receive, from the base station via the transceiver, downlink control information (DCI) on a PDCCH associated with a paging radio network temporary identifier (P-RNTI), the DCI indicating a second value of the time offset larger than the first value, and
   receive, from the base station via the transceiver, a paging message on a PDSCH based on the second value.

8. The terminal of claim 7, wherein, for identifying the first value, the controller is further configured to:
   receive, from the base station via the transceiver, system information including the first value, and
   identify the first value included in the received system information.

9. The terminal of claim 7, wherein the PDSCH including the paging message is received after the PDCCH associated with the paging is processed.

10. A base station in a wireless communication system, the base station comprising:
    a transceiver; and
    a controller configured to:
    identify a first value of a time offset between a physical downlink control channel (PDCCH) slot and a physical downlink shared channel (PDSCH) slot, wherein the first value is predetermined,
    transmit, to a terminal, system information including an indicator associated with a cross-slot scheduling for a paging, transmit, to the terminal via the transceiver, downlink control information (DCI) on a PDCCH associated with a paging radio network temporary identifier (P-RNTI), the DCI indicating a second value of the time offset larger than the first value and, transmit, to the terminal via the transceiver, a paging message on a PDSCH according to the second value.

11. The base station of claim 10, wherein the controller is further configured to transmit, to the terminal via the transceiver, system information including the first value.

12. The base station of claim 10, wherein the PDSCH including the paging message is transmitted after the PDCCH associated with the paging is processed in the terminal.

* * * * *